(12) United States Patent
Zhang

(10) Patent No.: US 6,432,586 B1
(45) Date of Patent: Aug. 13, 2002

(54) SEPARATOR FOR A HIGH ENERGY RECHARGEABLE LITHIUM BATTERY

(75) Inventor: Zhengming Zhang, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/546,266

(22) Filed: Apr. 10, 2000

(51) Int. Cl.$^7$ ................................................ H01M 2/16
(52) U.S. Cl. ...................... 429/251; 429/247; 429/248; 429/249; 429/252; 429/231.95
(58) Field of Search ................. 429/247, 248, 429/249, 251, 252, 231.95

(56) References Cited

U.S. PATENT DOCUMENTS

| | | | | |
|---|---|---|---|---|
| 5,631,103 A | * | 5/1997 | Eschbach et al. | 429/190 |
| 5,654,114 A | * | 8/1997 | Kubota et al. | 429/218 |
| 5,849,433 A | * | 12/1998 | Venugopal et al. | 429/190 |
| 6,242,135 B1 | * | 6/2001 | Mushiake | 429/304 |

FOREIGN PATENT DOCUMENTS

| | | | | |
|---|---|---|---|---|
| EP | 19914272 | * | 10/1999 | H01M/2/14 |
| WO | WO 98/59387 | * | 12/1998 | H01M/10/40 |

OTHER PUBLICATIONS

Wang, et al., Poly(ethylene oxide)–silica hybrid materials for lithium battery application, 1999, Elsevier Science B.V., 39(4), pp. 206–210.*

* cited by examiner

*Primary Examiner*—Patrick Ryan
*Assistant Examiner*—Angela J Martin
(74) *Attorney, Agent, or Firm*—Robert H. Hammer, III

(57) ABSTRACT

The instant invention is directed to a separator for a high energy rechargeable lithium battery and the corresponding battery. The separator includes a ceramic composite layer and a polymeric microporous layer. The ceramic layers includes a mixture of inorganic particles and a matrix material. The ceramic layer is adapted, at least, to block dendrite growth and to prevent electronic shorting. The polymeric layer is adapted, at least, to block ionic flow between the anode and the cathode in the event of thermal runaway.

12 Claims, 1 Drawing Sheet

SEPARATOR FOR A HIGH ENERGY RECHARGEABLE LITHIUM BATTERY

FIELD OF THE INVENTION

A separator for a high energy rechargeable lithium battery and a high energy rechargeable lithium battery are disclosed herein.

BACKGROUND OF THE INVENTION

A high energy rechargeable lithium battery has an anode with an energy capacity of at least 372 milliampere-hours/gram (mAh/g). Such anodes include, for example, lithium metal, lithium alloys (e.g. lithium aluminum), and mixtures of lithium metal or lithium alloys and materials such as carbon, nickel, and copper. Such anodes exclude anodes solely with lithium intercalation or lithium insertion compounds.

The commercial success of lithium metal or lithium alloy batteries has eluded all but primary cells due to persistent safety problems.

The difficulties associated with the use of the foregoing anodes stem mainly from lithium dendrite growth that occurs after repetitive charge-discharge cycling. (While dendrite growth is a potential problem with any lithium battery, the severity of the problem with the above-mentioned high energy anodes is much greater than with other lithium anodes (e.g. pure carbon intercalation anodes) as is well known in the art.) When lithium dendrites grow and penetrate the separator, an internal short circuit of the battery occurs (any direct contact between anode and cathode is referred to as "electronic" shorting, and contact made by dendrites is a type of electronic shorting). Some shorting (i.e., a soft short), caused by very small dendrites, may only reduce the cycling efficiency of the battery. Other shorting may result in thermal runaway of the lithium battery, a serious safety problem for lithium rechargeable battery.

The failure to control the dendrite growth from such anodes remains a problem, limiting the commercialization of cells with those anodes, particularly those cells with liquid organic electrolytes.

Accordingly, there is a need to improve high energy rechargeable lithium batteries.

SUMMARY Of THE INVENTION

The instant invention is directed to a separator for a high energy rechargeable lithium battery and the corresponding battery. The separator includes at least one ceramic composite layer and at least one polymeric microporous layer. The ceramic composite layer includes a mixture of inorganic particles and a matrix material. The ceramic composite layer is adapted, at least, to block dendrite growth and to prevent electronic shorting. The polymeric layer is adapted, at least, to block ionic flow between the anode and the cathode in the event of thermal runaway.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
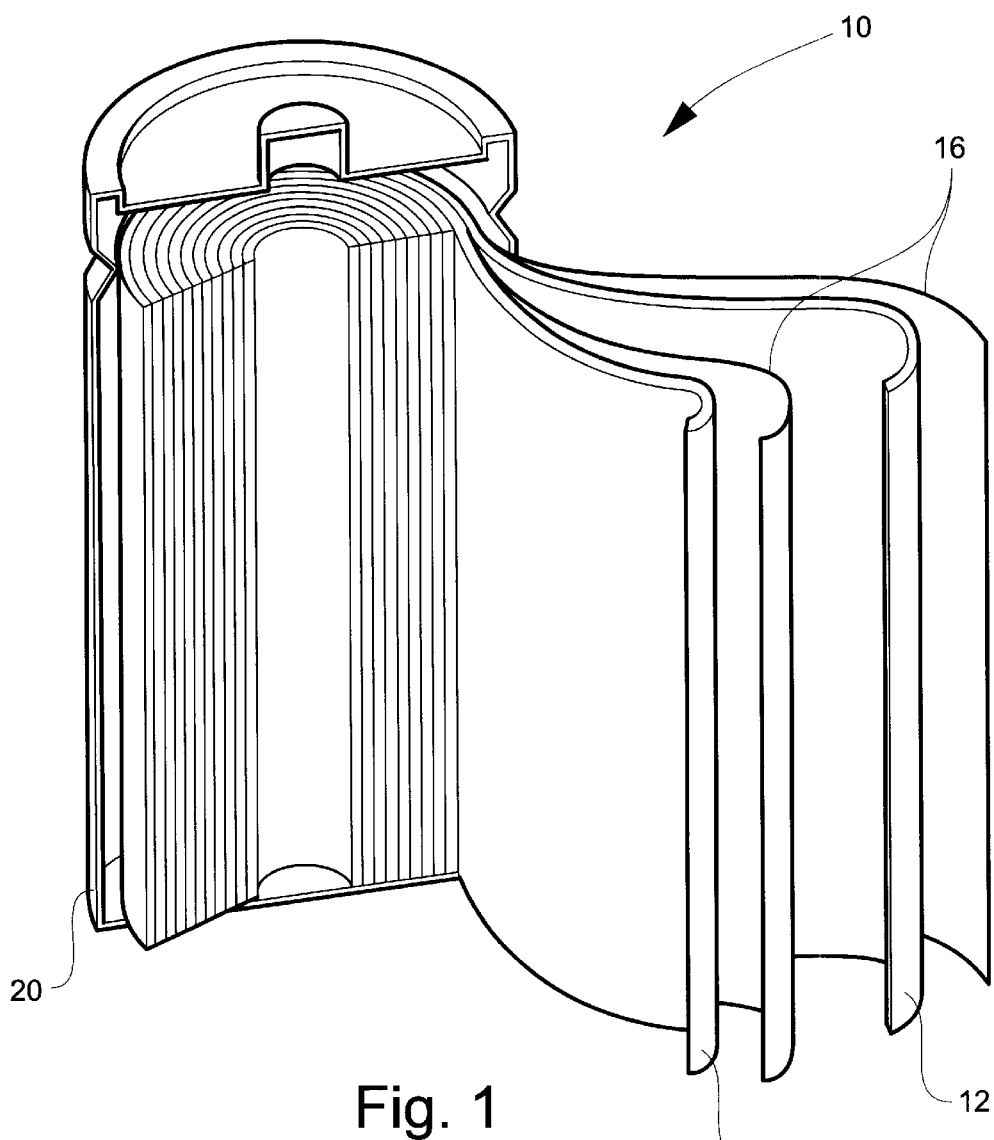
FIG. 1 is a sectional view of a lithium metal battery.

Referring to the figures, wherein like numerals indicate like elements, there is shown in FIG. 1 a lithium metal battery (or cell) 10. Lithium metal cell 10 comprises a lithium metal anode 12, a cathode 14, and a separator 16 disposed between anode 12 and cathode 14, all of which is packaged within a can 20. The illustrated cell 10 is a cylindrical cell or 'jelly roll' cell, but the invention is not so limited. Other configurations, for example, prismatic cells, button cells, or polymer cells are also included. Additionally, not shown is the electrolyte. The electrolyte may be a liquid (organic or inorganic), or a gel (or polymer). The invention will be, for convenience, described with regard to a c ylindrical cell with a liquid organic electrolyte, but it is not so limited and may find use in other cell types (e.g. energy storage system, combined cell and capacitor) and configurations.

The anode 12 should have an energy capacity greater than or equal to 372 mAh/g, preferably $\geq$700 mAh/g, and most preferably $\geq$1000 mAH/g. Anode 12 may be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode 12 is not made solely from intercalation compounds containing lithium or insertion compounds containing lithium.

The cathode 14 may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

The electrolyte may be liquid or gel (or polymer). Typically, the electrolyte primarily consists of a salt and a medium (e.g. in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, MN) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethylmethyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF: chlorotrifluoro ethylene) PAN (polyacrylonitrile), and PEO (polyethylene oxide).

Figure 2:
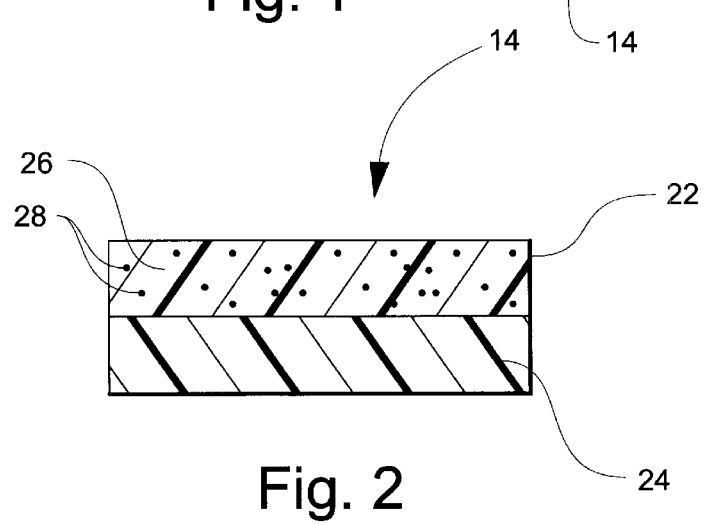
FIG. 2 is a cross-sectional view of the separator.

Referring to FIG. 2, separator 16 is shown. Separator 16 comprises a ceramic composite layer 22 and a polymeric microporous layer 24. The ceramic composite layer is, at least, adapted for preventing electronic shorting (e.g. direct or physical contact of the anode and the cathode) and blocking dendrite growth. The polymeric microporous layer is, at least, adapted for blocking (or shutting down) ionic conductivity (or flow) between the anode and the cathode during the event of thermal runaway. The ceramic composite layer 22 of separator 16 must be sufficiently conductive to allow ionic flow between the anode and cathode, so that current, in desired quantities, may be generated by the cell. The layers 22 and 24 should adhere well to one another, i.e. separation should not occur. The layers 22 and 24 may be formed by lamination, coextrusion, or coating processes. Ceramic composite layer 22 may be a coating or a discrete layer, either having a thickness ranging from 0.001 micron to 50 microns, preferably in the range of 0.01 micron to 25 microns. Polymeric microporous layer 24 is preferably a discrete membrane having a thickness ranging from 5 microns to 50 microns, preferably in the range of 12 microns to 25 microns. The overall thickness of separator 16 is in the range of 5 microns to 100 microns, preferably in the range of 12 microns to 50 microns.

Ceramic composite layer 22 comprises a matrix material 26 having inorganic particles 28 dispersed therethrough. Ceramic composite layer 22 is nonporous (it being understood that some pores are likely to be formed once in contact with an electrolyte, but ion conductivity of layer 22 is primarily dependent upon choice of the matrix material 26 and particles 28). The matrix material 26 of layer 22 differs from the foregoing polymer matrix (i.e., that discussed above in regard to the medium of the electrolyte) in, at least, function. Namely, matrix material 26 is that component of a separator which, in part, prevents electronic shorting by preventing dendrite growth; whereas, the polymer matrix is limited to the medium that carries the dissociated salt by which current is conducted within the cell. The matrix material 26 may, in addition, also perform the same function as the foregoing polymer matrix (e.g. carry the electrolyte salt). The matrix material 26 comprises about 5-80% by weight of the ceramic composite layer 22, and the inorganic particles 28 form approximately 20–95% by weight of the layer 22. Preferably, composite layer 22 contains inorganic particles 30%–75% by weight. Most preferably, composite layer 22 contains inorganic particles 40%–60% by weight.

The matrix material 26 may be ionically conductive or non-conductive, so any gel forming polymer suggested for use in lithium polymer batteries or in solid electrolyte batteries may be used. The matrix material 26 may be selected from, for example, polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, and mixtures thereof. The preferred matrix material is PVDF and/or PEO and their copolymers. The PVDF copolymers include PVDF:HFP (polyvinylidene fluoride:hexafluoropropylene) and PVDF:CTFE (polyvinylidene fluoride:chlorotrifluoroethylene). Most preferred matrix materials include PVDF:CTFE with less than 23% by weight CTFE, PVDH:HFP with less than 28% by weight HFP, any type of PEO, and mixtures thereof.

The inorganic particles 28 are normally considered nonconductive, however, these particles, when in contact with the electrolyte, appear, the inventor, however, does not wish to be bound hereto, to develop a superconductive surface which improves the conductivity (reduces resistance) of the separator 16. The inorganic particles 28 may be selected from, for example, silicon dioxide ($SiO_2$), aluminum oxide ($Al_2O_3$), calcium carbonate ($CaCO_3$), titanium dioxide ($TiO_2$), $SiS_2$, $SiPO_4$ and the like, or mixtures thereof. The preferred inorganic particle is $SiO_2$, $Al_2O_3$, and $CaCO_3$. The particles may have an average particle size in the range of 0.001 micron to 25 microns, most preferably in the range of 0.01 micron to 2 microns.

The microporous polymeric layer 24 consists of any commercially available microporous membranes (e.g. single ply or multi-ply), for example, those products produced by Celgard Inc. of Charlotte, North Carolina, Asahi Chemical of Tokyo, Japan, and Tonen of Tokyo, Japan. The layer 24 has a porosity in the range of 20–80%, preferably in the range of 28–60%. The layer 24 has an average pore size in the range of 0.02 to 2 microns, preferably in the range of 0.08 to 0.5 micron. The layer 24 has a Gurley Number in the range of 15 to 150 sec, preferably 30 to 80 sec. (Gurley Number refers to the time it takes for 10 cc of air at 12.2 inches of water to pass through one square inch of membrane.) The layer 24 is preferably polyolefinic. Preferred polyolefins include polyethylene and polypropylene. Polyethylene is most preferred.

The foregoing separator, while primarily designed for use in high energy rechargeable lithium batteries, may be used in other battery systems in which dendrite growth may be a problem.

The foregoing shall be further illustrated with regard to the following non-limiting examples.

EXAMPLES

Sixty (60) parts of fine particle calcium carbonate, 40 parts of PVDF:HFP (Kynar 2801), are dissolved in 100 parts of acetone at 35° C. for 3 hours under high shear mixing. The solution is cast into a 15 micron film. After vaporization of the actone at room temperature, the composite film was thermally laminated with 2 layers (8 microns) of Celgard 2801 membrane. The resulting composite shutdown separator has a structure of PE/composite/PE and a thickness of 30 microns.

Thirty (30) parts of silicon dioxide, 30 parts of calcium carbonate, 40 parts of PVDF:HFP (Kynar 2801) are dissolved in 100 parts of acetone at 35° C. for 3 hours under high shear mixing. This solution was cast or coated onto a 23 micron layer of a polyethylene microporous layer made by Celgard Inc. After vaporization of the acetone at room temperature, the polyethylene/composite membrane had a thickness of 38 microns.

The present invention may be embodied in other specific forms without departing from the spirit or essential attributes thereof and, accordingly, reference should be made to the appended claims, rather than to the foregoing specification, as indicating the scope of the invention.

What is claimed is:

1. A separator for a high energy rechargeable lithium battery comprises:
   at least one ceramic composite layer, said layer including a mixture of inorganic particles in a matrix material; said layer being adapted to at least block dendrite growth and to prevent electronic shorting; and
   at least one polyolefinic microporous layer, said layer being adapted to block ionic flow between an anode and a cathode.

2. The separator according to claim 1 wherein said mixture comprises between 20% to 95% by weight of said inorganic particles and between 5% to 80% by weight of said matrix material.

3. The separator according to claim 1 wherein said inorganic particles are selected from the group consisting of $SiO_2$, $Al_2O_3$, $CaCO_3$, $TiO_2$, $SiS_2$, $SiPO_4$ and the like, and mixtures thereof.

4. The separator according to claim 1 wherein said matrix material is selected from the group consisting of polyethylene oxide, polyvinylidene fluoride, polytetrafluoroethylene, polyurethane, polyacrylonitrile, polymethylmethacrulate, polytetraethylene glycol diacrylate, copolymers thereof, and mixtures thereof.

5. The separator according to claim 1 wherein said polyolefinic microporous layer is a polyolefinic membrane.

6. The separator according to claim 5 wherein said polyolefinic membrane is a polyethylene membrane.

7. A separator for a high energy rechargeable lithium battery comprises:

at least one ceramic composite layer or coating, said layer including a mixture of 20–95% by weight of inorganic particles selected from the group consisting of $SiO_2$, $Al_2O_3$, $CaCO_3$, $TiO_2$, $SiS_2$, $SiPO_4$ and the like, and mixtures thereof, and 5–80% by weight of a matrix material selected from the group consisting of polyethylene oxide, polyvinylidene fluoride, polytetrafluoroethylene, copolymers of the foregoing, and mixtures thereof; and at least one polyolefinic microporous layer having a porosity in the range of 20–80%, an average pore size in the range of 0.02 to 2 microns, and a Gurley Number in the range of 15 to 150 sec.

8. The separator according to claim 7 wherein said inorganic particles have an average particle size in the range of 0.001 to 24 microns.

9. The separator according to claim 7 wherein said inorganix particles are selected from the group consisting of $SiO_2$, $Al_2O_3$, $CaCO_3$, and mixtures thereof.

10. The separator according to claim 7 wherein said matrix material is selected from the group consisting of polyvinylidene fluoride and/or polyethylene oxide, their copolymers, and mixtures thereof.

11. A high energy rechargeable lithium battery comprising:

an anode containing lithium metal or lithium-alloy or a mixtures of lithium metal and/or lithium alloy and another material;

a cathode;

a separator according to claims 1–10 disposed between said anode and said cathode; and an electrolyte in ionic communication with said anode and said cathode via said separator.

12. A separator for an energy storage system comprises:

at least one ceramic composite layer or coating, said layer including a mixture of 20–95% by weight of inorganic particles selected from the group consisting of $SiO_2$, $Al_2O_3$, $CaCO_3$, $TiO_2$, $SiS_2$, $SiPO_4$ and the like, and mixtures thereof, and 5–80% by weight of a matrix material selected from the group consisting of polyethylene oxide, polyvinylidene fluoride, polytetrafluoroethylene, copolymers of the foregoing, and mixtures thereof, said layer being adapted to at least block dendrite growth and to prevent electronic shorting; and at least one polyolefinic microporous layer having a porosity in the range of 20–80%, an average pore size in the range of 0.02 to 2 microns, and a Gurley Number in the range of 15 to 150 sec, said layer being adapted to block ionic flow between an anode and a cathode.

\* \* \* \* \*

UNITED STATES PATENT AND TRADEMARK OFFICE
CERTIFICATE OF CORRECTION

| | | |
|---|---|---|
| PATENT NO. | : 6,432,586 B1 | Page 1 of 1 |
| APPLICATION NO. | : 09/546266 | |
| DATED | : August 13, 2002 | |
| INVENTOR(S) | : Zhengming Zhang | |

It is certified that error appears in the above-identified patent and that said Letters Patent is hereby corrected as shown below:

In the Claims:

Column 4, line 54 (in claim 3): delete "and the like".

Column 5, line 4 (in claim 7): delete "and the like".

Column 6, line 12 (in claim 12): delete "and the like".

Signed and Sealed this
Twenty-third Day of April, 2013

Teresa Stanek Rea
*Acting Director of the United States Patent and Trademark Office*